(12) United States Patent
Berends et al.

(10) Patent No.: US 11,122,257 B2
(45) Date of Patent: Sep. 14, 2021

(54) HDR IMAGE CAPTURE AND DISPLAY SYSTEM FOR ENHANCED REAL-TIME WELDING VISUALIZATION AND ASSISTANCE

(71) Applicants: SRI International, Menlo Park, CA (US); Kawada Technologies, Inc., Tokyo (JP)

(72) Inventors: David Berends, Skillman, NJ (US); Naohiko Fuse, Ryugasaki (JP); Atsushi Homma, Suita (JP); Noriyuki Kanehira, Utsunomiya (JP); Tadahisa Tsuyama, Sakaide (JP); Michael Piacentino, Robbinsville, NJ (US); Gooitzen van der Wal, Hopewell, NJ (US); Chiharu Yamaoka, Utsunomiya (JP); David Zhang, Belle Mead, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/421,022

(22) Filed: May 23, 2019

(65) Prior Publication Data

US 2020/0374510 A1    Nov. 26, 2020

(51) Int. Cl.
*G06K 9/00* (2006.01)
*H04N 13/361* (2018.01)
(Continued)

(52) U.S. Cl.
CPC ......... *H04N 13/361* (2018.05); *B23K 9/0956* (2013.01); *B23K 9/322* (2013.01); *G02B 27/0172* (2013.01); *G09B 5/02* (2013.01); *G09B 19/24* (2013.01); *H04N 5/2353* (2013.01); *H04N 13/156* (2018.05); *H04N 13/239* (2018.05); *H04N 13/344* (2018.05);
(Continued)

(58) Field of Classification Search
None
See application file for complete search history.

(56) References Cited

U.S. PATENT DOCUMENTS 4,730,096 A * 3/1988 Mizumoto ........... B23K 9/0956
                                                219/130.01
4,850,712 A * 7/1989 Abshire ............... B23Q 35/128
                                                   356/602
(Continued)

FOREIGN PATENT DOCUMENTS

WO    WO-2008018526 A1 *  2/2008  ............. B23K 3/063

*Primary Examiner* — Atiba O Fitzpatrick
(74) *Attorney, Agent, or Firm* — Moser Taboada

(57) ABSTRACT

A method, apparatus and system for enhanced welding visualization include splitting incoming light from the welding environment into at least a first optical path and a second optical path having different light levels using at least one beam splitter. Images of the split light having different light levels are captured using a respective imaging sensor. The images from the respective imaging sensors are fused to create a left-eye fused image and a right-eye fused image. The left-eye fused image is displayed on a display at a location of a left eye of a user and the right-eye fused image is displayed on a display at a location of a right eye of the user to provide a parallax-free, high dynamic range, representation of the welding environment.

19 Claims, 9 Drawing Sheets

(51) Int. Cl.
  *H04N 13/156*   (2018.01)
  *H04N 13/239*   (2018.01)
  *H04N 13/344*   (2018.01)
  *H04N 13/398*   (2018.01)
  *H04N 5/235*    (2006.01)
  *G09B 19/24*    (2006.01)
  *G09B 5/02*     (2006.01)
  *B23K 9/095*    (2006.01)
  *B23K 9/32*     (2006.01)
  *G02B 27/01*    (2006.01)

(52) U.S. Cl.
  CPC ..... *H04N 13/398* (2018.05); *G02B 2027/014* (2013.01); *G02B 2027/0138* (2013.01); *G02B 2027/0141* (2013.01)

(56) References Cited

U.S. PATENT DOCUMENTS

| | | | |
|---|---|---|---|
| 7,658,891 B1* | 2/2010 | Barnes | A61L 9/015 |
| | | | 128/205.28 |
| 8,908,054 B1* | 12/2014 | Koenck | H04N 5/2254 |
| | | | 348/218.1 |
| 9,380,273 B1* | 6/2016 | Jensen | H04N 5/332 |
| 2012/0291172 A1* | 11/2012 | Wills | A42B 3/042 |
| | | | 2/8.2 |
| 2016/0284311 A1* | 9/2016 | Patel | G09G 5/10 |
| 2016/0375524 A1* | 12/2016 | Hsu | B23K 26/03 |
| | | | 228/8 |
| 2017/0289424 A1* | 10/2017 | Beeson | A61F 9/06 |
| 2018/0071854 A1* | 3/2018 | Matthews | B23K 9/322 |

* cited by examiner

HDR IMAGE CAPTURE AND DISPLAY SYSTEM FOR ENHANCED REAL-TIME WELDING VISUALIZATION AND ASSISTANCE

FIELD

Embodiments of the present principles generally relate to welding environments, and more particularly, to methods, apparatuses, and systems for providing enhanced real-time welding visualization and assistance.

BACKGROUND

To date the majority of welding processes are performed manually however, welding-related industries, such as the manufacturing industry and the construction industry, are facing an apparent shortage of experienced/skilled welders. That is, a rapidly retiring workforce in concurrence with the slow pace of traditional instructor-based welder training can be attributed as a cause of such shortage of experienced/skilled welders.

Fully automated/robotic approaches provide one way to address the shortage of experienced/skilled welders however, automated/robotic devices can be relatively more expensive and the set up and tear down of the equipment can be cumbersome, reducing any efficiencies. In addition, there are areas in which automated/robotic devices cannot fit.

In some current day systems designed to provide welding assistance, filters are used to provide images of, for example a welding environment, having different dynamic ranges. However, filters are not very durable or accurate and can wear quickly requiring frequent replacement. In addition, in those and other systems images captured by cameras are merely combined to produce an image/video of, for example, a welding environment having an expanded dynamic range. However, a simple combination of camera images can result in a loss of details of each of the images. For example, U.S. Pat. No. 9,918,018, issued Mar. 13, 2018 to Beeson, teaches dynamic range enhancement methods and systems for display for use in welding applications that uses filters for providing images of, for example a welding environment, having different dynamic ranges and also only teaches combining images captured by different cameras to produce an image/video having an expanded dynamic range. The invention of U.S. Pat. No. 9,918,018 suffers such deficiencies described above.

SUMMARY

Embodiments of methods, apparatuses and systems for enhanced real-time welding visualization and assistance are disclosed herein.

In some embodiments in accordance with the present principles, an apparatus for enhanced real-time welding visualization in a welding environment includes a beam splitter splitting incoming light from the welding environment into at least a first optical path and a second optical path having different light levels, the at least first and second optical paths each comprising a respective imaging sensor, a control unit receiving and fusing the images from each of the respective imaging sensors in the at least first optical path and second optical path to create a left eye fused image and a right eye fused image, and a display assembly displaying the left eye fused image at a location of a left eye of a user of the apparatus and the right eye fused image at a location of a right eye of the user of the apparatus.

In some embodiments in accordance with the present principles, the apparatus can further include a left eye imaging assembly and a right eye imaging assembly, each of the left eye imaging assembly and the right eye imaging assembly including at least one beam splitter splitting incoming light from the welding environment into at least a first optical path and a second optical path having different light levels, the at least first and second optical paths each comprising a respective imaging sensor, where images captured in the left eye imaging assembly are fused and displayed at the location of the left eye of the user of the apparatus and images captured in the right eye imaging assembly are fused and displayed at the location of the right eye of the user of the apparatus to provide a three dimensional representation of the welding environment.

In some embodiments in accordance with the present principles, a method for enhanced real-time welding visualization in a welding environment, includes, in a wearable welding apparatus, splitting incident light from the welding environment into at least a first optical path and a second optical path having different light levels using at least one beam splitter, in each of the at least first optical path and second optical path, capturing images of the respective, split light using an imaging sensor, fusing the images from the respective imaging sensors of the least first optical path and second optical path of the left eye imaging assembly and the right eye imaging assembly to create a left eye fused image and a right eye fused image, and displaying the left eye fused image on a display at a location of a left eye of a user of the wearable welding apparatus and the right eye fused image on a display at a location of a right eye of the user of the wearable welding apparatus.

In some embodiments in accordance with the present principles, the method can further include splitting the incident light from the welding environment into at least a first optical path and a second optical path having different light levels using at least one beam splitter in each of a left eye imaging assembly and a right eye imaging assembly and fusing and displaying images captured in the left eye imaging assembly at the location of the left eye of the user of the apparatus and fusing and displaying images captured in the right eye imaging assembly at the location of the right eye of the user to provide a three dimensional representation of the welding environment.

In some embodiments in accordance with the present principles, a method for enhanced real-time welding visualization and assistance in a welding environment includes splitting incoming light into a first optical path having a minority of the split light and a second optical path having a majority of the split light using a beam splitter, and in the first optical path, focusing the minority of the split light from the beam splitter using a high f-number lens, filtering the focused light from the high f-number lens using a neutral density filter, and capturing images of the filtered light from the neutral density filter using a first camera. In some embodiments the method can further include, in the second optical path, focusing the majority of the split light from the beam splitter using a low f-number lens, capturing images of the light from the low f-number lens using a second camera. The method can further include fusing the images from the first camera and the second camera, and displaying at least a portion of the fused images as left eye display images and right eye display images.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1A:
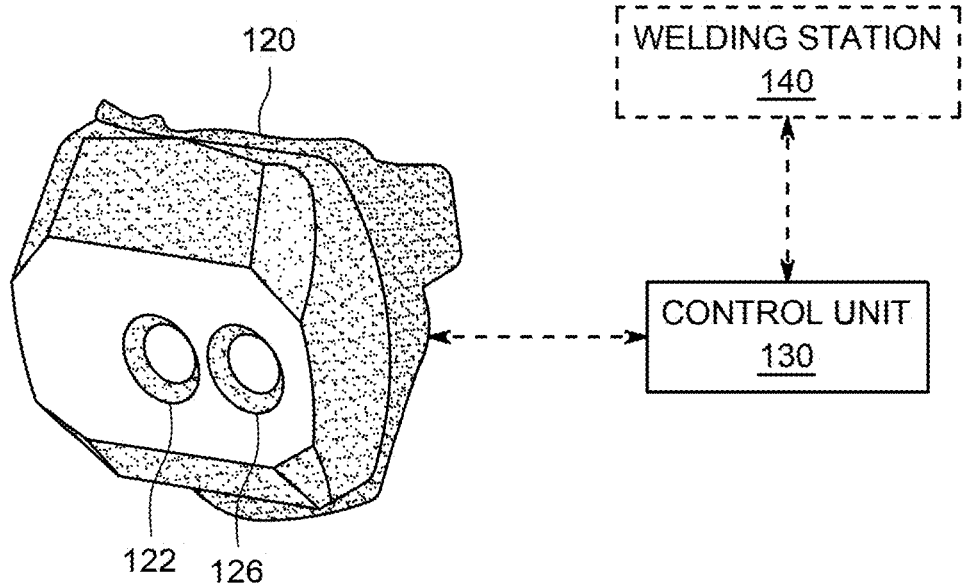
FIG. 1a depicts a high level block diagram of an advanced welding mask/helmet system for enhanced real-time welding visualization and assistance in accordance with a first embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for providing enhanced real-time welding visualization and assistance. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to a particular welding mask/helmet system having specific components in a particular welding environment, such teachings should not be considered limiting. Embodiments in accordance with the present principles can be implemented within substantially any welding mask/helmet in substantially any welding environment within the concepts of the present principles.

Embodiments in accordance with the present principles provide a welding mask/helmet system including a welding mask/helmet integrated with one or multiple sensors including but not limited to cameras, acoustic microphones, infrared sensors, thermal cameras, accelerometers, and GPS devices. In addition, the welding mask/helmet can include communication means and accept data from one or multiple external sensors. In various embodiments, sensor information can be displayed on a screen that can be integrated within the welding mask/helmet and, in some embodiments, can be integrated within a visor portion of the welding mask/helmet.

In various embodiments in accordance with the present principles, in a welding helmet/mask system, incident light from a welding environment is split into at least two optical paths (i.e., a plurality of optical paths) of varying light levels. In each of the at least two optical paths, the light of the varying light levels is captured by a respective imaging sensor to create images/video streams of the welding environment having different exposure levels. That is, in some embodiments, image frames of a welding environment are captured using different optical paths having different light levels. The dark and bright scene details of the welding environment can be captured by differentiating the light levels in each of the optical paths by using beam splitters, using different f-number lenses or placing different neural density filters in some or all of the optical paths. In some embodiments requiring stereo-vision, in each of a left-eye imaging assembly and a right-eye imaging assembly, incident light from a welding environment is split into at least two optical paths (i.e., a plurality of optical paths) of varying light levels. In each of the at least two optical paths in each of a left-eye imaging assembly and a right-eye imaging assembly, the light of the varying light levels is captured by a respective imaging sensor to create images/video streams of the welding environment having different exposure levels.

Advantageously because of the architecture of a welding helmet/mask system in accordance with the present principles, image frames of the welding environment can be captured at the same time, but the intensity of each frame is differentiated by at least one of a beam splitter, f-number lenses or by neutral density filters. Such components are implemented in accordance with the present principles to control an amount of light energy captured by respective imaging sensors.

In addition or alternatively, in some embodiments, at least one imaging sensor can be configured to capture images of the welding environment at different frame rates to capture images with different light levels. For example, in some embodiments, at least one imaging sensor can be configured to capture images of the welding environment at a higher frame rate. In some embodiments, the imaging sensor can run double or higher of the display rate, and each of the image frames can be configured with different exposure times, such that dark scenes which require high exposure time, and bright scenes which require low exposure time, can be captured in sequence. Although in such embodiments, image frames are not captured at the same time, because they are captured at least double of the display rates, the spatial difference can be ignored for welding systems.

The respective images captured by the imaging sensors of the at least two optical paths or the at least four optical paths for an embodiment including stereo/three-dimensional capabilities including each of a left-eye imaging assembly and a right-eye imaging assembly, are fused by a processor, of for example a control unit, into fused left-eye and right-eye images of the welding environment having the details of each of the different exposure images/video streams of the welding environment. The fused left-eye images are displayed on a left-eye display to be presented to a left-eye of a user of the helmet/mask system of the present principles and the fused right-eye images are displayed on a right-eye display to be presented to a right-eye of the user of the helmet/mask system of the present principles.

In some embodiments, the light from the welding environment is split into the at least two optical paths having different light levels by at least one respective beam splitter. In some other embodiments, the light from the welding environment is split into a plurality of optical paths having different light levels by more than one respective beam splitter. The split light in each of the optical paths can be directed perpendicularly to the respective imaging sensor in each of the optical paths. Advantageously, the architecture of a welding mask helmet/mask system in accordance with the present principles and specifically the arrangement of the beam splitter, the multiple optical paths having varying light levels, and the respective imaging sensors, provides a parallax-free, high dynamic range visualization and video acquisition system. In addition, in some embodiments, the architecture of a welding mask helmet/mask system in accordance with the present principles and specifically the respective imaging sensors of the left-eye imaging assembly and the right-eye imaging assembly, advantageously provide separate left-eye images and right-eye images, providing a three-dimensional representation of the welding environment to optimize depth perception.

Some embodiments in accordance with the present principles further provide welding assistance to a user of an advanced welding mask/helmet system of the present principles. That is, in some embodiments, information and images can be presented to a user of an advanced welding mask/helmet system of the present principles in the form of at least audio and images presented on a display to assist a welder in the performance of a weld.

It should be noted that the term light intensity as used throughout this disclosure is intended to encompass both the principles of light intensity and dynamic range.

FIG. 1a depicts a high level block diagram of an advanced welding mask/helmet system 100 in accordance with an embodiment of the present principles. The advanced welding mask/helmet system 100 of FIG. 1 illustratively comprises a welding mask/helmet 120 and a control unit 130. The welding mask/helmet 120 of FIG. 1 illustratively comprises an imaging assembly 122 and an optional sensor 126. FIG. 1 further depicts a remote welding station 140, which contains welding equipment and accessories for performing welding operations. Although in FIG. 1a, the advanced welding mask/helmet system 100 is depicted as comprising a single sensor 126 (e.g., the optional sensor) and the optional sensor 126 is depicted as being mounted on the welding mask/helmet 120, in other embodiments in accordance with the present principles, a welding mask/helmet system can comprise more than one sensor (described in greater detail below), with some sensors able to be mounted on the welding mask/helmet 120 and other sensors comprising separate components.

Figure 1B:
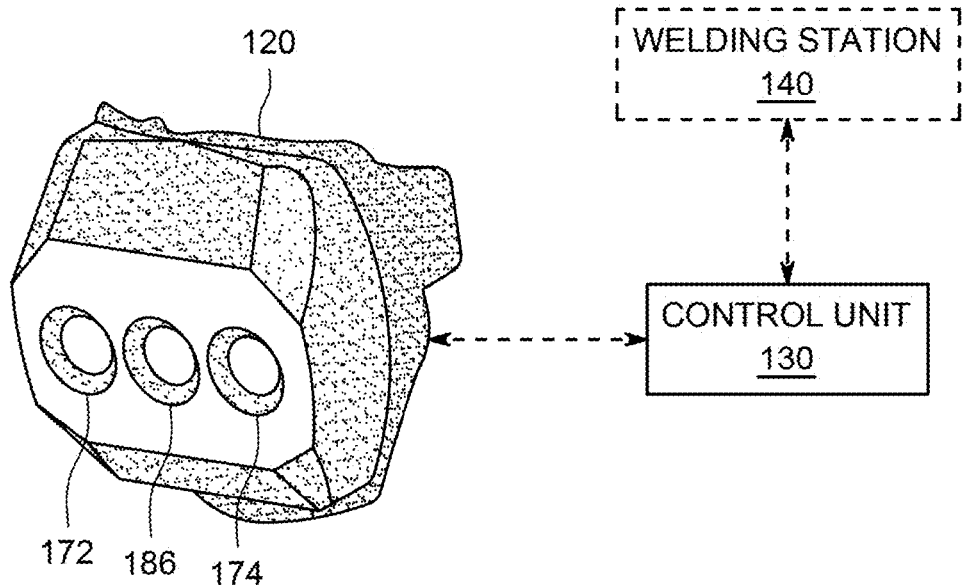
FIG. 1b depicts a high level block diagram of an advanced welding mask/helmet system for enhanced real-time welding visualization and assistance having three-dimensional imaging capabilities in accordance with a second embodiment of the present principles.

FIG. 1b depicts a high level block diagram of an advanced welding mask/helmet system 100 in accordance with a second, stereo/three-dimensional embodiment of the present principles. The advanced welding mask/helmet system 160 of FIG. 1b illustratively comprises a welding mask/helmet 120 and a control unit 130. The welding mask/helmet 120 of FIG. 1b illustratively comprises a left-eye imaging assembly 182, a right-eye imaging assembly 184, and an optional sensor 186. FIG. 1b further depicts a remote welding station 140, which contains welding equipment and accessories for performing welding operations. Although in FIG. 1b, the advanced welding mask/helmet system 160 is depicted as comprising a single sensor 186 (e.g., the optional sensor) and the optional sensor 186 is depicted as being mounted on the welding mask/helmet 120, in other embodiments in accordance with the present principles, a welding mask/helmet system can comprise more than one sensor (described in greater detail below), with some sensors able to be mounted on the welding mask/helmet 120 and other sensors comprising separate components.

Figure 2:
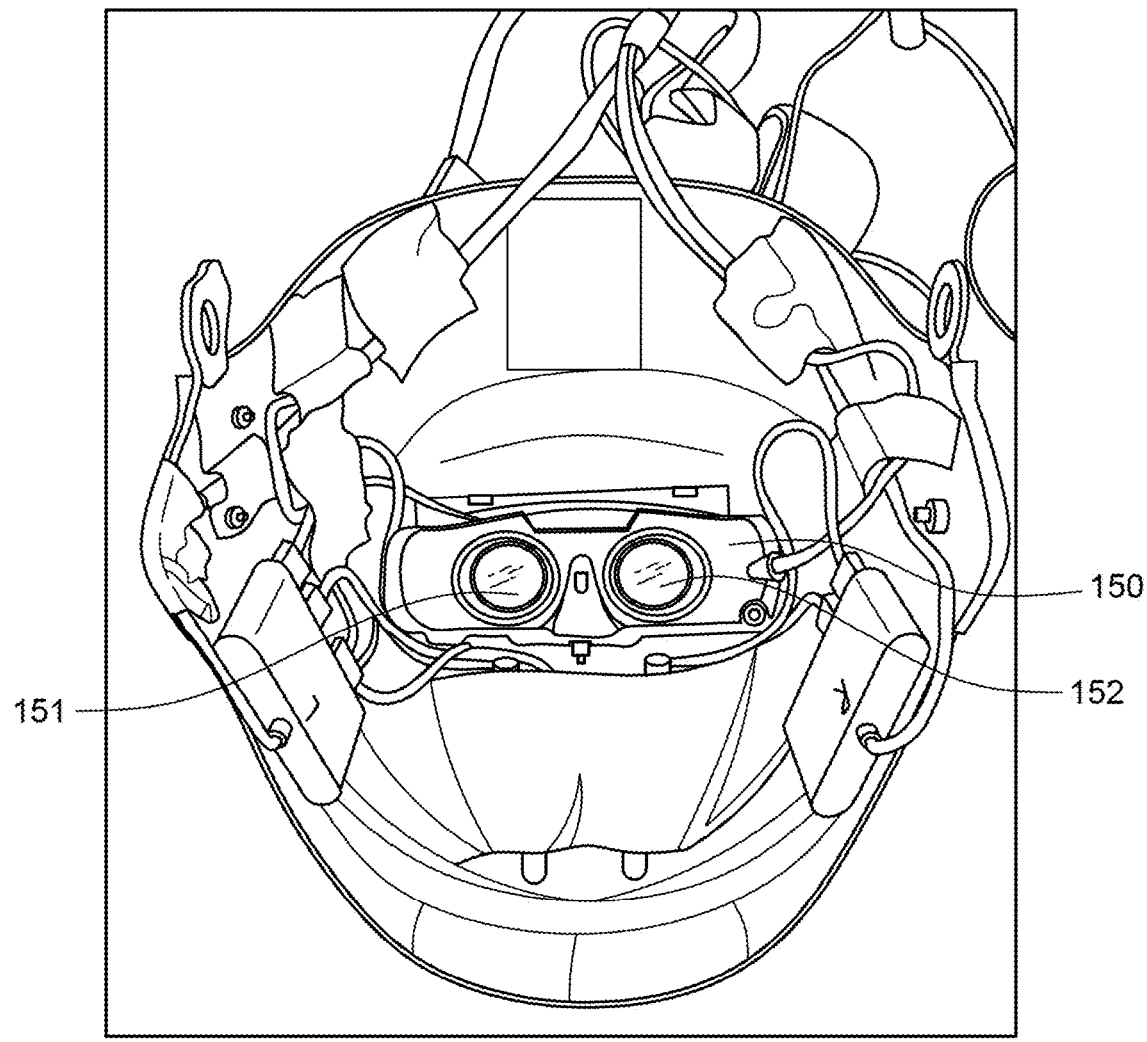
FIG. 2 depicts a high level block diagram of the inside of the mask/helmet of the advanced welding mask/helmet system of FIG. 1 in accordance with an embodiment of the present principles.

FIG. 2 depicts a high level block diagram of the inside of the mask/helmet 120 of the advanced welding mask/helmet system 100/160 of FIGS. 1a and 1b in accordance with an embodiment of the present principles. As depicted in FIG. 2, the mask/helmet 120 can comprise a display 150 on the inside for presenting images, video streams and data and information to a user of the mask/helmet 120. In the embodiment of FIG. 2, the display 150 of the mask/helmet 120 comprises a head mounted display (HMD) 150 mounted inside of the mask/helmet 120. In some embodiments, the HMD 150 comprises adjustable display positioning to meet a user's needs concerning inclination as well as a distance between the left and right displays of the HMD 150. As depicted in FIG. 2, the display 150 of the mask/helmet 120 can include a first viewing means (e.g., display) 151 at a location of a left eye of a user and a second viewing means (e.g., display) 152 at a location of a right eye of a user.

Figure 3:
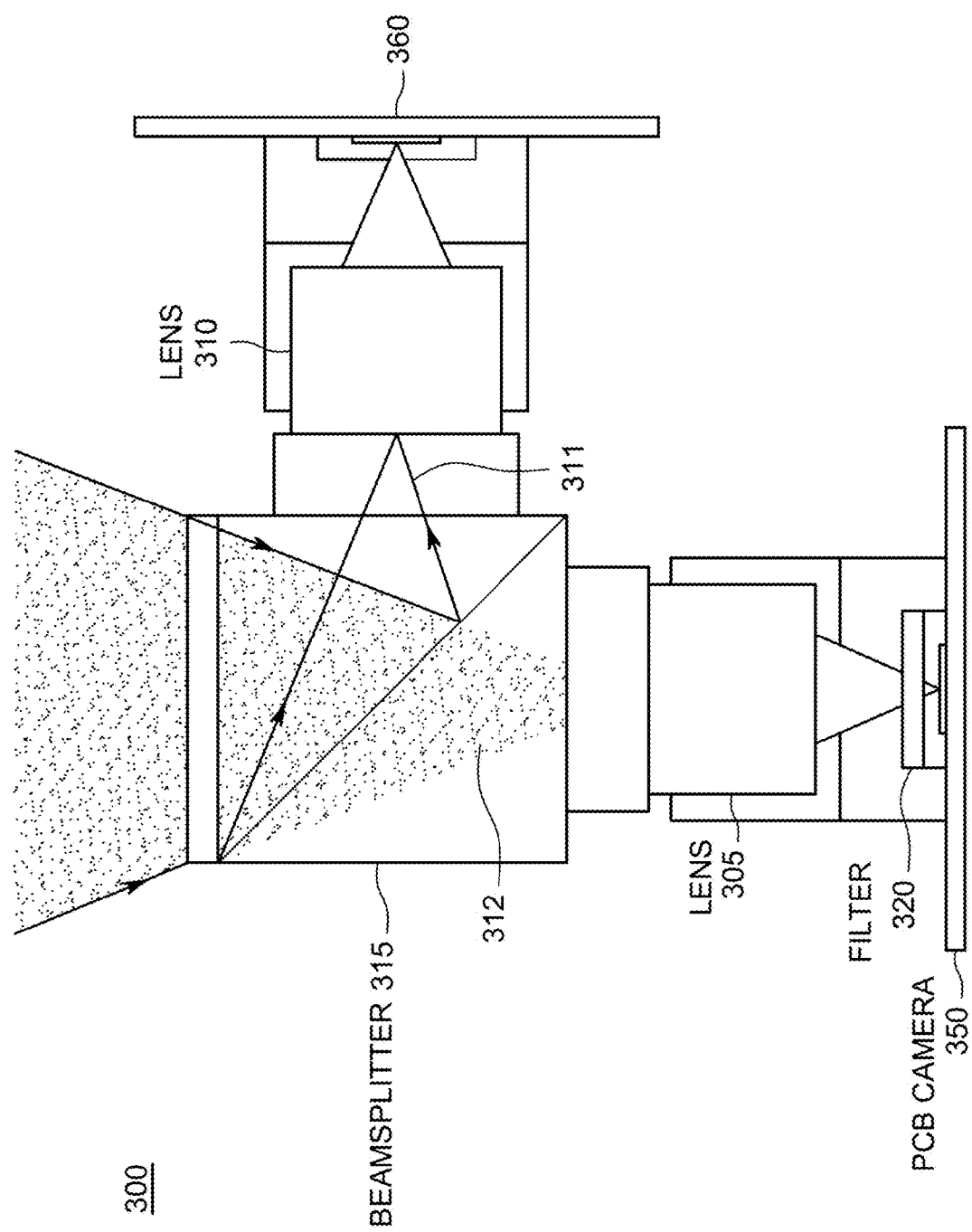
FIG. 3 depicts a high level block diagram of an imaging assembly suitable for use in the welding mask/helmet system of FIG. 1 in accordance with an embodiment of the present principles.

FIG. 3 depicts a high level block diagram of an imaging assembly 300 suitable for use in the welding mask/helmet system 100 of FIG. 1a and the welding mask/helmet system 160 of FIG. 1b as the imaging assembly 122 or, in a stereo/three-dimensional embodiment, as the left-eye imaging assembly 172 and the right-eye imaging assembly 174, in accordance with an embodiment of the present principles. The imaging assembly 300 of FIG. 3 illustratively comprises a first camera lens 305, a second camera lens 310, a beam splitter 315, an optional filter 320, a first camera 350 and a second camera 360 (illustratively printed circuit board cameras).

In the embodiment of the imaging assembly 300 FIG. 3, incident light from the welding environment is split by the beam splitter 315 into, illustratively, two optical paths. The beam splitter 315 of the embodiment of FIG. 3 illustratively comprises a beam splitter that splits incident light into a first optical path 311 comprising a majority of the light and a second optical path 312 comprising a minority of the light. For example, in the imaging assembly 300 of the embodiment of FIG. 3, the beam splitter 315 can a 60% reflection and 40% transmission beam splitter. That is, in the embodiment of the imaging assembly 300 FIG. 3, 40% of incident light travels through the beam splitter 315 along the first optical path 311 to the first camera lens 305 and 60% of incident light is reflected to the right along the second optical path 312 to the second camera lens 310. As such, in the imaging assembly 300 of FIG. 3, each of the two optical paths 311, 312 comprise different light levels.

In the embodiment of the imaging assembly 300 of FIG. 3, the first camera lens 305 illustratively comprises a high f-number lens and illustratively an f/6 lens and the second camera lens 310 illustratively comprises a low f-number camera lens and illustratively an f/2 lens. In the embodiment of FIG. 3, the first, f/6 camera lens 305 receives and focuses the 40% transmitted light from the beam splitter 315 and the second, f/2 camera lens 310 receives and focuses the 60% reflected light from the beam splitter 315. In the embodiment of FIG. 3, the different f-number camera lenses 305, 310 further differentiate the light levels in the two optical paths 311, 312.

In the embodiment of the imaging assembly 300 of FIG. 3, in the first optical path 311, the 40% of the light focused by the first, high f-number camera lens 305 can be filtered by the optional filter 320 (illustratively a neutral density filter). In the embodiment of FIG. 3, the optional filter 320 further differentiates the light levels in the two optical paths 311, 312.

In the embodiment of the imaging assembly 300 of FIG. 3, the 40% of the focused light filtered by the optional filter 320 is captured and imaged by the first camera 350 and the 60% of the light focused by the second lens 310 is captured and imaged by the second camera 360 creating images/video streams of the welding environment having two different light levels.

For example, in the imaging assembly 300 of FIG. 3, the first camera 350 collects much less light than the second camera 360 because the beam splitter 315 only transmits 40% of incident light to the first camera 350 and because the optional filter 320 (illustratively a 1.2 ND filter) allows only approximately 9% of light to pass to the first camera 350. In addition, in the imaging assembly 300 of FIG. 3 the first camera lens 305 collecting light to be directed to the first camera 350 is illustratively an f/6 lens, which accepts approximately eight (8) times less light than the second camera lens 310, which in the imaging assembly 300 of FIG. 3 is illustratively an f/2 lens.

Although the embodiment of the imaging assembly 300 of FIG. 3 illustratively comprises a beam splitter splitting incident light from a welding environment into two optical paths, a first optical path 311 comprising a majority of the split light and a low f-number lens and a second optical path 312 comprising a minority of the split light, a high f-number lens and a filter, the illustrated embodiment should not be considered limiting. The imaging assembly 300 of FIG. 3 is intended to depict an embodiment of at least one imaging assembly comprising one or more beam splitters splitting incident light into at least two optical paths having varying light levels for providing a parallax-free, high dynamic range video acquisition system creating images/video streams of the welding environment having two respective exposure levels enabling both, bright and dark scene details to be captured, in some embodiments, at the same time. In other embodiments of the present principles, incident light from a welding environment can be split by one or more beam splitters into a plurality of optical paths having different light levels ultimately creating images/video streams of the welding environment having a plurality of respective exposure levels in accordance with the present principles enabling both, bright dark and in-between light level scene details to be captured, in some embodiments, at the same time.

In addition or alternatively, as described above, in some embodiments in accordance with the present principles, at least one imaging sensor (e.g., camera) can be configured to capture images of the welding environment at a higher frame rate. In such embodiments, the imaging sensor can run double or higher of the display rate, and each of the image frames can be configured with different exposure times, such that dark scenes which require high exposure time, and bright scenes which require low exposure time, can be captured. In such embodiments, images of the welding environment can be captured at multiple frame rates with various exposure times such that scenes of the welding environment having light levels between very dark scenes and very bright scenes can also be captured.

In accordance with the above described embodiments, in each imaging assembly of the present principles, such as the imaging assembly 300 FIG. 3, the video streams captured by the two imaging sensors (e.g., camera 350 and camera 360) are communicated to the control unit 130. At the control unit 130, the video streams are combined into a left-eye image(s)/video stream and a right-eye image(s)/video stream using fusion technology. In some embodiments in accordance with the present principles, Laplacian Pyramid Fusion technology from SRI International in Menlo Park, Calif. is implemented for fusing the four video streams, the Laplacian Pyramid Fusion technology being the subject of U.S. Pat. No. 8,411,938 entitled MULTI-SCALE MULTI-CAMERA ADAPTIVE FUSION WITH CONTRAST NORMALIZATION and assigned to SRI International, which is incorporated herein by reference in its entirety.

In some embodiments, the fused video streams result in an 8-bit output stream capable of being displayed on a display such as a computer monitor or a head-mounted display while retaining all of the details originally in the four separate video streams. That is, extremely bright details of, for example, a welding arc and objects near the welding arc, extremely dark details, for example, the background of the welding environment, and images having a brightness in between are preserved in the fused output.

Figure 4:
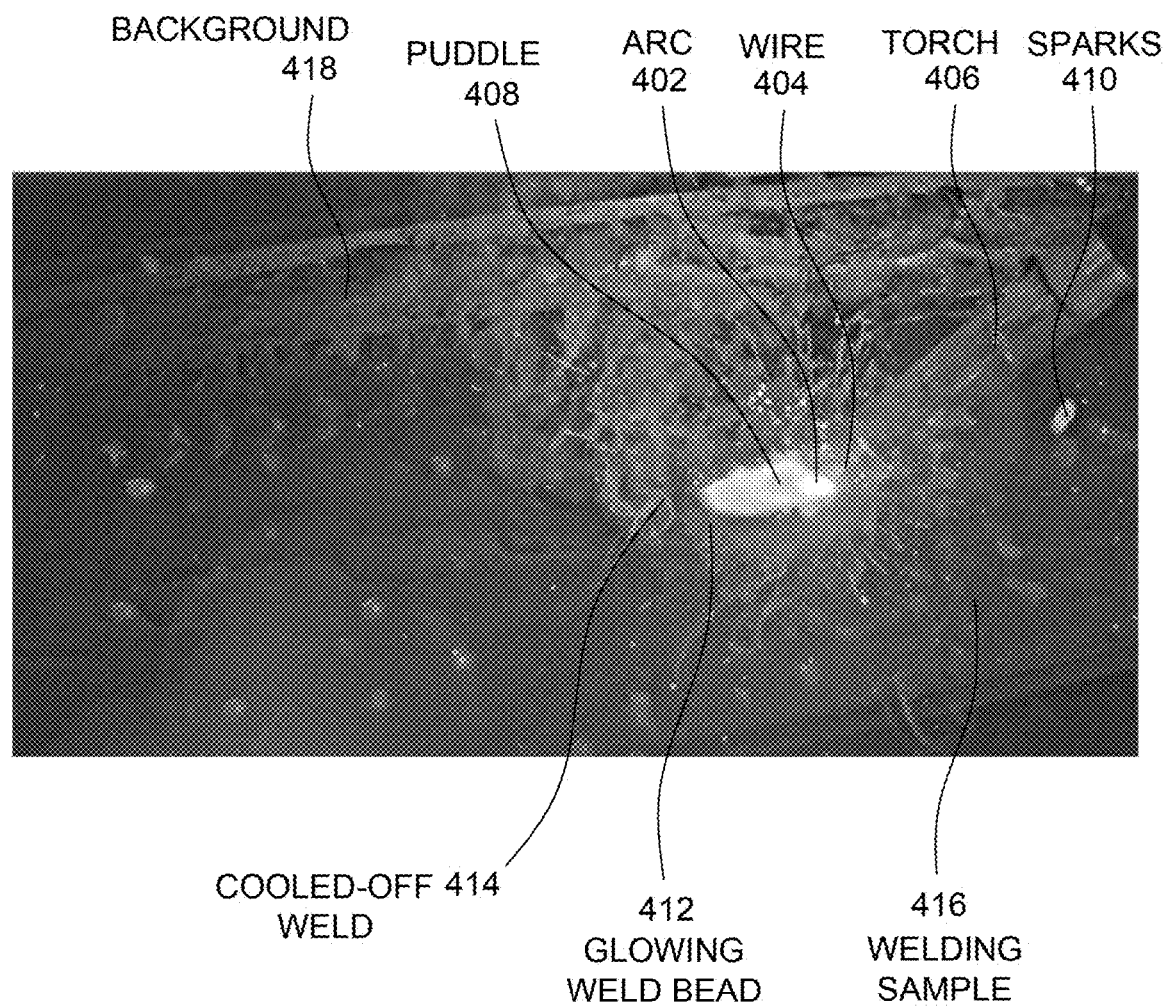
FIG. 4 depicts a pictorial depiction of an image of a welding environment captured by an advanced welding mask/helmet system in accordance with an embodiment of the present principles.

For example, FIG. 4 depicts a pictorial depiction of an image of a welding environment captured by an advanced welding mask/helmet system in accordance with an embodiment of the present principles. In the embodiment of FIG. 4, it is clear that in an image captured by an advanced welding mask/helmet system in accordance with an embodiment of the present principles, the welding torch 402, the welding wire 404, the welding arc 406, the welding puddle 408, welding sparks 410, a glowing bead of a weld that just solidified 412, the bead of the weld as the bead cools down and no longer glows 414, a welding sample 416, and the background 418 of the welding environment are all simultaneously visible on a display, such as the HMD 150, and visible by a user of an advanced welding mask/helmet system of the present principles.

In some embodiments, an image fusion process first decomposes each source image into multi-spatial, multi-band images, which are called a pyramid of images. Each image in a pyramid corresponds to a narrow frequency band. Image fusion enforces a selection rule that selects best features per pixel and per band among all source images. The local selection is based on the strength of salient features, the confidence of the pixels from the source images. For example, if an area in a source image is saturated, or is full of noise, the pixels in that area has zero confidence, then in the selection of features in the corresponding locations per band, pixels pertaining to saturation and noise are not selected. The selection process outputs one image per band, which maintains the best features per frequency band. These banded images thus form a fused pyramid. Lastly, a reverse process is performed as referenced to decomposition is to reconstruct the fused pyramid into a single fused image. This fused image contains the best valid local structures from each of the source images.

Referring back to FIGS. 1b-3, in some stereo/three-dimensional embodiments in accordance with the present principles, the output stream of the left eye imaging assembly 122 is displayed on the HMD 150 of the welding mask/helmet 120 of the advanced welding mask/helmet system 100 of FIG. 1 such that the output stream of the left eye imaging assembly 122 is visible by a left eye of a user of the welding mask/helmet 120. Similarly, in some embodiments in accordance with the present principles, the output stream of the right eye imaging assembly 124 is displayed on the HMD 150 of the welding mask/helmet 120 of the advanced welding mask/helmet system 100 of FIG. 1 such that the output stream of the right eye imaging assembly 124 is visible by a right eye of a user of the welding mask/helmet 120. In some alternate embodiments in accordance with the present principles, a display of the welding mask/helmet 120 comprises a single display upon which streams are displayed at appropriate locations to be viewed by an appropriate eye of a user. In some other embodiments in accordance with the present principles, a display of the welding mask/helmet 120 comprises a dedicated display for each eye of a user.

The dedicated capture and assignment of images/video streams for display to a specific eye of a user of the welding mask/helmet 120 in accordance with the present principles, results in a true stereoscopic (e.g., 3D) visualization for a user. To preserve a realistic depth perception, in some embodiments in accordance with the present principles, the first imaging assembly 122 and the second imaging assembly 124 are physically mounted and oriented on the welding mask/helmet 120 of the welding mask/helmet system 160 of FIG. 1b so as to approximate the pose and intra-ocular separation of a human welder.

In some embodiments of the welding mask/helmet system in accordance with the present principles, during welding and specifically during a period in which the welding arc is on, in each imaging assembly, such as the imaging assembly 300 of FIG. 3, images of the welding environment are acquired by the first camera 350 through the beam splitter 315, the high f-number first camera lens 305 and the filter 320. More generally, during periods of extreme brightness, images/video streams of a welding environment are captured using components in optical paths, which ultimately comprise much less light intensity than components and optical path comprising more light intensity. Conversely, during periods of relatively greater darkness and specifically during a period in which the welding arc is off, images of the welding environment are acquired by the second camera 360 through the beam splitter 315. More generally, during periods of darkness, images/video streams are captured using components in optical paths which ultimately comprise much more light intensity than components and an optical path comprising less light intensity.

The architecture of the welding mask/helmet system 100 of FIG. 1a and 160 of FIG. 1b in accordance with the present principles, and specifically the arrangement of the beam splitter 315 and the first and second camera 350, 360 of the imaging assembly 300, provides a parallax-free, high dynamic range video acquisition system for a welding environment.

In addition, advantageously, because of the architecture of the welding mask/helmet system 100 of FIG. 1a and 160 of FIG. 1b in accordance with embodiments of the present principles, a user is able to keep wearing the welding mask/helmet 120 of the welding mask/helmet system 100/160 during both, periods of extreme brightness and extreme darkness in the welding environment and still be able to see a clear image of the welding environment. More specifically and referring back to FIGS. 1-3, in some embodiments in accordance with the present principles, the optional sensor 126/186 of the welding mask/helmet system 100 of FIG. 1a and the welding mask/helmet system 160 of FIG. 1b can include a light sensor 126/186 which can be mounted on the welding mask/helmet 120. In some embodiments, the light sensor 126/186 senses periods of brightness in the welding environment (i.e., when a weld arc is on) and communicates a signal to the control unit 130 indicating the existence of the brightness in the welding environment. In some other embodiments, the optional light sensor 126/186 senses periods of darkness in the welding environment (i.e., when a weld arc is off) and communicates a signal to the control unit 130 indicating the existence of the darkness in the welding environment.

Upon receiving a signal from the light sensor 126/186, the control unit 130 determines, based on the signal received, from which imaging sensor (e.g., the first camera 350 or the second camera 360) to display captured image(s)/video stream on a display of the welding mask/helmet 120. For example and as described above, in some embodiments, during periods of extreme brightness in the welding environment, in response to a signal received from the optional light sensor, the control unit 130 causes a video stream captured by the first camera 350 to be displayed on a display of the welding mask/helmet 120 for a respective eye of a user. Conversely and as described above, in some embodiments, during periods of extreme darkness in the welding environment, in response to a signal received from the optional light sensor, the control unit 130 causes a video stream captured by the second camera 360 to be displayed on a display of the welding mask/helmet 120 for a respective eye of a user.

Alternatively or in addition, in some embodiments in accordance with the present principles, a signal captured by at least one of the first camera 350 and the second camera 360 can be implemented by, for example, the control unit 130 to determine from which camera (e.g., the first camera 350 or the second camera 360) to display a captured video stream on a display of the welding mask/helmet 120. For example, if a captured video stream from any of the four cameras (e.g., the first camera 350 and the second camera 360) indicates a presence of brightness in the welding environment, the control unit 130, having access to the captured video streams of each of the four cameras, causes a video stream captured by the first camera 350 (which collects less light) to be displayed on a display of the welding mask/helmet 120 for a respective eye of a user. Conversely, if captured video streams of the four cameras (e.g., the first camera 350 and the second camera 360) indicate a presence of darkness in the welding environment, the control unit 130 causes a video stream captured by the second camera 360 to be displayed on a display of the welding mask/helmet 120 for a respective eye of a user.

In some embodiments in accordance with the present principles, sparks generated in a welding environment by, for example, arc welding can be eliminated from a display of a video stream. More specifically, sparks evident in an image or images captured by one of the cameras (e.g., the first camera 350 and the second camera 360) can be identified by the control unit 130, for example, when processing the captured video streams. At the control unit 130, the portions (e.g., pixels) of the images containing sparks can be eliminated from the images. For example, in some embodiments in accordance with the present principles, signals of the camera pixels containing sparks can be eliminated and an average of signals from surrounding/neighboring pixels can replace the eliminated signals.

Figure 5A:
FIG. 5a depicts a source image of a welding environment including welding sparks, captured, for example, by a first imaging sensor in a first optical path of at least one of a left-eye imaging assembly and a right-eye imaging assembly of a welding mask/helmet system in accordance with an embodiment of the present principles.
Figure 5B:
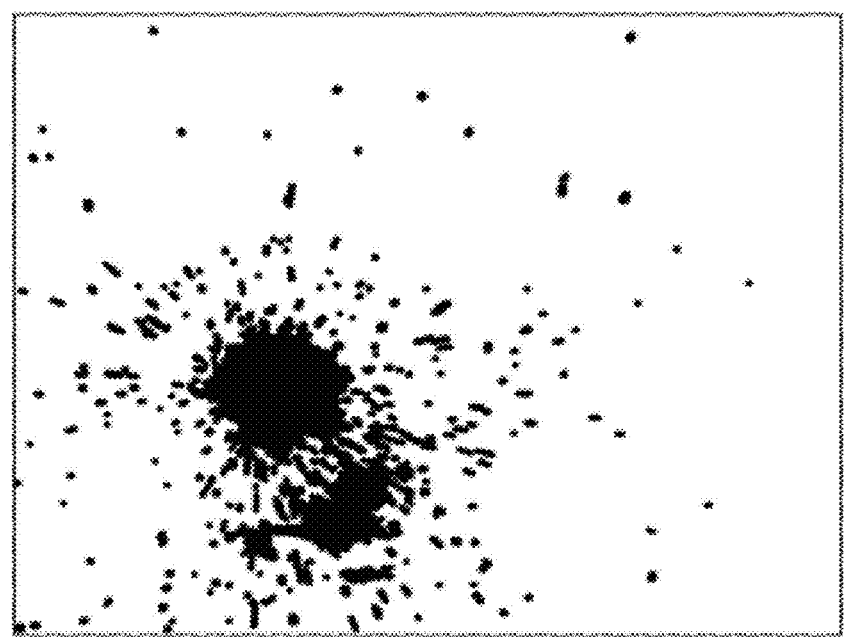
FIG. 5b depicts a binary saturation mask generated from the source image of FIG. 5a in accordance with an embodiment of the present principles

For example, FIGS. 5a and 5b depict a pictorial representation of a spark removal process in accordance with an embodiment of the present principles. FIG. 5a depicts a first source image of a welding environment including welding sparks, captured, for example, by a first imaging sensor in a first optical path of a welding mask/helmet system in accordance with the present principles. In the embodiment of FIGS. 5a and 5b, a binary saturation mask, as depicted in FIG. 5b, is generated from the source image of FIG. 5a. The individual sparks are then detected from the mask image and the area of each spark is computed. Based on a predetermined threshold size value, saturated regions in the source image corresponding to the welding tip and the background of the welding environment are excluded from the binary saturation mask. Values surrounding the sparks are then determined. For example, in some embodiments, the contour for each spark is enlarged with morphological operations in the binary mask image. Values along the contours of a spark in the image are accumulated and an average contour value per spark is calculated. A pixel value of each spark is then replaced with the calculated average value.

In some embodiments in accordance with the present principles, at least one of the imaging sensors (e.g., the first camera 350 and the second camera 360) comprises at least one near infrared (NIR) camera. In such embodiments, a welding mask/helmet system in accordance with the present principles is able to provide a clear image of a welding environment even if the welding environment is filled with smoke.

Referring back to FIGS. 1a and 1b, in some embodiments in accordance with the present principles, the optional sensor 126/186 of the welding mask/helmet system 100/160 can comprise at least one temperature sensor such as a low resolution infrared camera or thermal sensor. That is, a parameter that is particularly important to detect in welding is not only the temperature in the actual melting zone but also the heat distribution in the surrounding material. In embodiments of a welding mask/helmet system 100/160 which include at least one infrared camera 126/186 or thermal sensor for sensing temperature, the at least one infrared camera or thermal sensor 126/186 can sense temperature of the actual melting zone in the welding environment and also the heat distribution in the surrounding material. The data collected by the at least one infrared camera or thermal sensor 126/186 is communicated to the control unit 130. The control unit 130 can cause the temperature data to be displayed on the HMD 150 of the welding mask/helmet 120 in an arbitrary manner. For example, in some embodiments, the temperature data can be displayed as numerical data, diagrams, by coloring different temperature ranges differently which are shown in an image representing a weld and the surrounding zone, via a heat map or a combination of any of the above.

In some embodiments, the temperature information can be displayed on a dedicated part of a display either over an image or video stream of the welding environment or outside of a display of an image or video stream of a welding environment.

In some embodiment in accordance with the present principles, the optional sensor 126/186 can include at least one of a camera, acoustic microphone, infrared sensor, thermal camera, accelerometer, and a GPS device for providing respective information to the control unit 130 to be used for providing information and welding assistance to a user of a welding mask/helmet system of the present principles at least as described herein with respect to any sensor.

In various embodiments in accordance with the present principles, the control unit 130 of the welding mask/helmet system 100/160 of FIGS. 1a and 1b can enable a user to interact with the welding mask/helmet system 100 and with the welding environment for example, via the welding station 140. For example, in some simple embodiments, the control unit 130 can cause a presentation of information related to the welding environment and the welding station 140 to be presented to a user via the HMD 150. For example, in some embodiments, using integrated or external thermal sensors, a temperature of the objects that are being welded can be monitored and the control unit 130 can cause the display of such information on the HMD 150 as, for example, a thermal image is overlaid on the video stream image of the welding environment such that a welder is able to make decisions about how to change a weld procedure or parameters so that a desired weld can be achieved. For example, a welder can adjust a dwell time at a particular site in response to the temperature of the objects being welded. Other welding parameters that can be displayed to and adjusted by a welder can include but are not limited to a feed speed of a weld wire, a position of a weld wire, a position of the weld torch, a current or voltage of a power supply associated with the weld torch and the like.

In some embodiments in accordance with the present principles, the control unit 130 can communicate with the welding station 140 to determine parameters of the welding environment for a least displaying such parameters to a user of the welding mask/helmet system 100/160 via, for example, the HMD 150. In some embodiments, the control unit 130 can communicate with the welding station 140 via a wired connection, such as USB or HDMI or alternatively or in addition, the control unit 130 can communicate with the welding station 140 via a wireless connection, such as Bluetooth or Wi-Fi. Having such information, such as welding parameters, displayed on for example the HMD 150, a welder is able to make decisions about how to change a weld procedure or parameters so that a desired weld can be achieved.

In some embodiments in accordance with the present principles, image(s)/video stream(s) of the weld process captured by at least one of the cameras (e.g., the first camera 350 and the second camera 360) can be recorded by, for example, the control unit 130 in a memory of either the control unit 130 or an external memory. The quality of the weld can be determined by analyzing the recorded images of the weld at the control unit 130. For example, in some embodiments, recorded images of the weld process and/or the completed weld can be compared at the control unit 130 to stored images of what a proper weld process or completed weld should look like. The data regarding the weld quality can be used for various purposes including but not limited to machine learning, providing feedback regarding weld quality, and reporting or for redoing the welds if such a need arises. Feedback provided regarding weld quality can be provided to a user on a display of a welding mask/helmet system in accordance with embodiments of the present principles. A user can use such feedback to change a weld procedure or parameters so that a desired weld can be achieved.

In some embodiments of a welding mask/helmet system, such as the welding mask/helmet system 100 of FIG. 1a and the welding mask/helmet system 160 of FIG. 1b, augmented reality can be used to assist a welder/user in performing an improved weld. For example, before the commencement of a welding procedure, the control unit 130 can cause a display of a path along which the weld should occur on, for example, the HMD 150 for viewing by a welder. The path for a weld can be computed by, for example the control unit 130 or other control unit, based on knowledge of the geometry of the weld, the material properties of the materials involved, stored knowledge of the path of such welds and knowledge gained from previous similar welds.

During the welding, the determined path can be displayed to a welder/user over an area of the image/video stream of the weld environment at which the weld is to be made. The video stream of the welding by the welder can be monitored by the control unit 130 to determine if the determined path is being followed by the welder during the welding process. If any deviation from the previously calculated path is determined, a warning can be provided to the welder in the form of a visual cue on, for example, the HMD 150.

Figure 6:
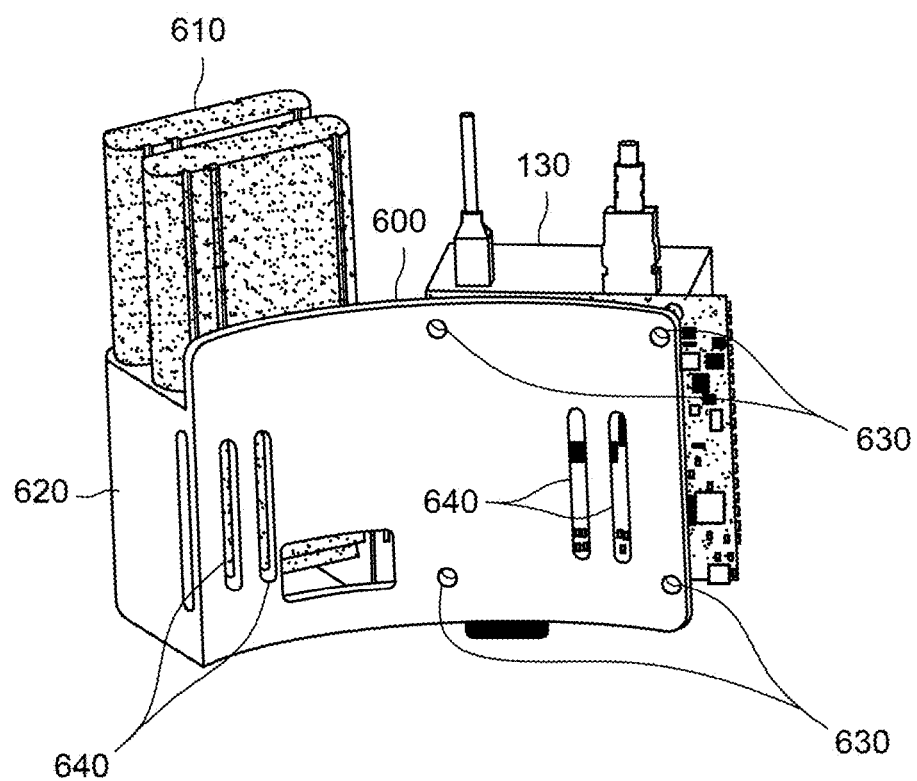
FIG. 6 depicts a high level block diagram of a belt assembly for housing the control unit and a battery for powering the control unit in accordance with an embodiment of the present principles.

In some embodiments in accordance with the present principles, the welding mask/helmet system 100 of FIG. 1a and the welding mask/helmet system 160 of FIG. 1b can further comprise an assembly for housing at least the control unit 130 and a power source for supplying power to the control unit 130. For example, FIG. 6 depicts a high level block diagram of a belt assembly 600 for housing the control unit 130 and a battery 610 for powering the control unit in accordance with an embodiment of the present principles. The belt assembly 600 of FIG. 6 comprises a compartment 620 for holding the battery 610 and fastening holes (illustratively four fastening holes, collectively 630) for attaching the control unit 130 to the belt assembly 600 via fasteners (not shown). The belt assembly 600 of FIG. 6 further comprises belt slots ((illustratively four belt slots, collectively 640) for securing a belt (not shown) to the belt assembly 600 such that a welder is able to secure the belt assembly 600 to, for example, the welder's waist using a belt (not shown).

Figure 7:
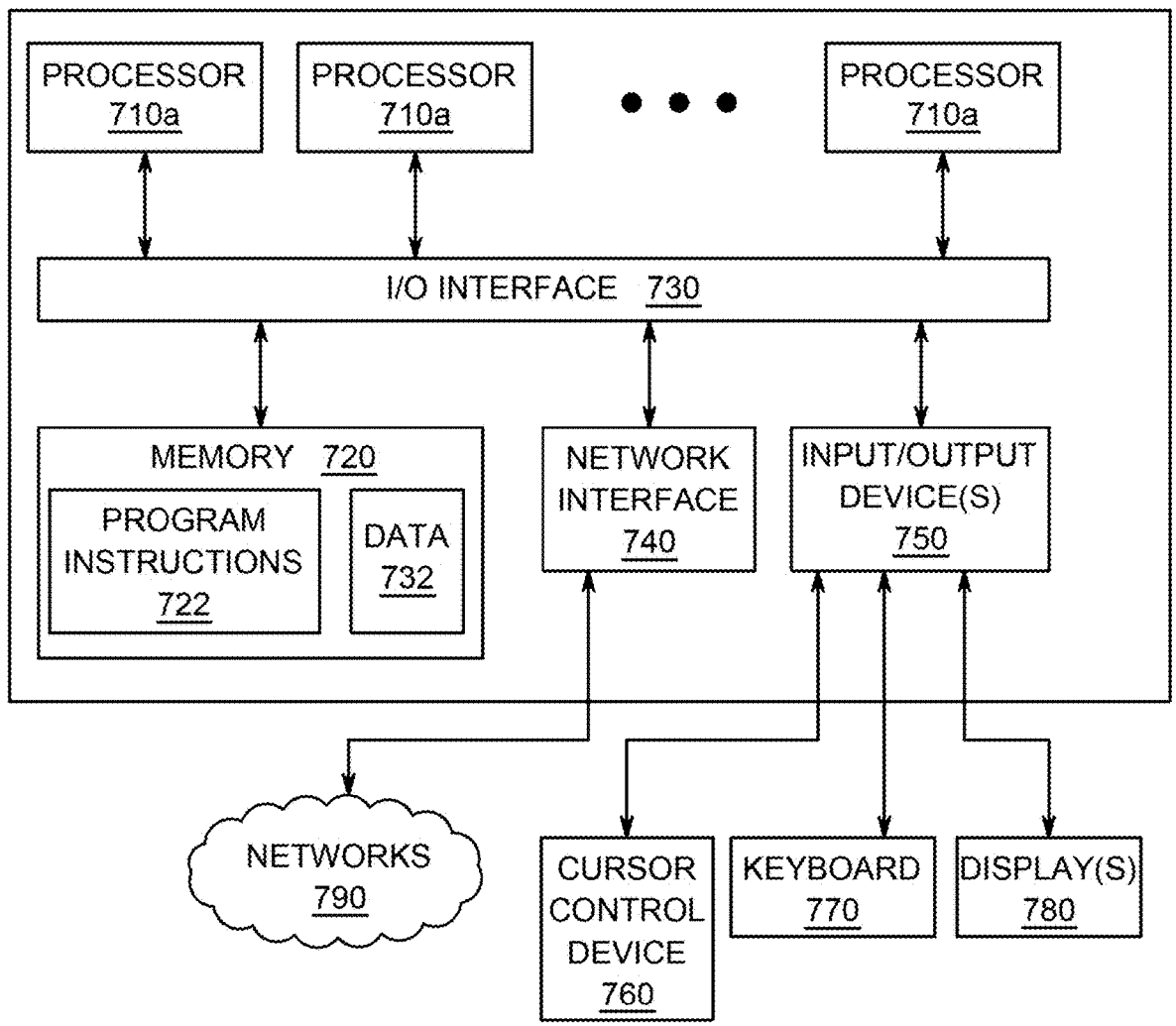
FIG. 7 depicts a high level block diagram of a control unit suitable for use in the welding mask/helmet systems of FIG. 1a and FIG. 1b in accordance with an embodiment of the present principles.

FIG. 7 depicts a high level block diagram of a control unit 130 suitable for use in the welding mask/helmet system 100 of FIG. 1a and the welding mask/helmet system 160 of FIG. 1b in accordance with an embodiment of the present principles. In some embodiments control unit 130 can be configured to implement the methods of the present principles as processor-executable executable program instructions 722 (e.g., program instructions executable by processor(s) 710) in various embodiments.

In the embodiment of FIG. 7, control unit 130 includes one or more processors 710a-710n coupled to a system memory 720 via an input/output (I/O) interface 730. The control unit 130 further includes a network interface 740 coupled to I/O interface 730, and one or more input/output devices 750, such as cursor control device 760, keyboard 770, and display(s) 780. In various embodiments, any of the components can be utilized by the system to receive user input described above. In various embodiments, a user interface can be generated and displayed on display 780. In some cases, it is contemplated that embodiments can be implemented using a single instance of the control unit 130, while in other embodiments multiple such systems, or multiple nodes making up the control unit 130, can be configured to host different portions or instances of various embodiments. For example, in one embodiment some elements can be implemented via one or more nodes of the control unit 130 that are distinct from those nodes implementing other elements. In another example, multiple nodes can implement the control unit 130 in a distributed manner.

In different embodiments, the control unit 130 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the control unit 130 can be a uniprocessor system including one processor 710, or a multiprocessor system including several processors 710 (e.g., two, four, eight, or another suitable number). Processors 710 can be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 720. In other embodiments, program instructions and/or data can be received, sent or stored upon different types of computer-accessible media or on similar media separate from system memory 720 or the control unit 130.

In one embodiment, I/O interface 730 can be configured to coordinate I/O traffic between processor 710, system memory 720, and any peripheral devices in the device, including network interface 740 or other peripheral interfaces, such as input/output devices 750. In some embodiments, I/O interface 730 can perform any necessary protocol, timing or other data transformations to convert data signals from one component (e.g., system memory 720) into a format suitable for use by another component (e.g., processor 710). In some embodiments, I/O interface 730 can include support for devices attached through various types of peripheral buses, such as a variant of the Peripheral Component Interconnect (PCI) bus standard or the Universal Serial Bus (USB) standard, for example. In some embodiments, the function of I/O interface 730 can be split into two or more separate components, such as a north bridge and a south bridge, for example. Also, in some embodiments some or all of the functionality of I/O interface 730, such as an interface to system memory 720, can be incorporated directly into processor 710.

Network interface 740 can be configured to allow data to be exchanged between the control unit 130 and other devices attached to a network (e.g., network 790), such as one or more external systems or between nodes of the control unit 130. In various embodiments, network 790 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 750 can, in some embodiments, include one or more display terminals, keyboards, keypads, touchpads, scanning devices, voice or optical recognition devices, or any other devices suitable for entering or accessing data by one or more computer systems. Multiple input/output devices 750 can be present in the control unit 130 or can be distributed on various nodes of the control unit 130. In some embodiments, similar input/output devices can be separate from the control unit 130 and can interact with one or more nodes of the control unit 130 through a wired or wireless connection, such as over network interface 740.

In some embodiments, the illustrated control unit 130 can implement any of the operations and methods described above, such as the methods illustrated by the flowcharts of FIG. 8 and FIG. 9 (described below). In other embodiments, different elements and data can be included.

Those skilled in the art will appreciate that the control unit 130 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The control unit 130 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

In some embodiments in accordance with the present principles, a user interface to enable a user to interact with at least the control unit 130 and to control parameters of the welding environment can be provided by the control unit 130. In some embodiments, the user interface can be implemented as a menu driven application presented on a display of an advanced welding mask/helmet system of the present principles, such as the advanced welding mask/helmet system 100 of FIG. 1a and the advanced welding mask/helmet system 160 of FIG. 1b, and the one or more input/output devices of at least the control unit 130 can be used to provide interaction between a user of an advanced welding mask/helmet system of the present principles and the user interface. In some embodiments, buttons or other control devices of a an assembly for housing at least the control unit 130 and a power source for supplying power to the control unit 130, for example, the belt assembly 600 of FIG. 6, can be implemented to provide interaction between a user of an advanced welding mask/helmet system of the present principles and the user interface.

Figure 8:
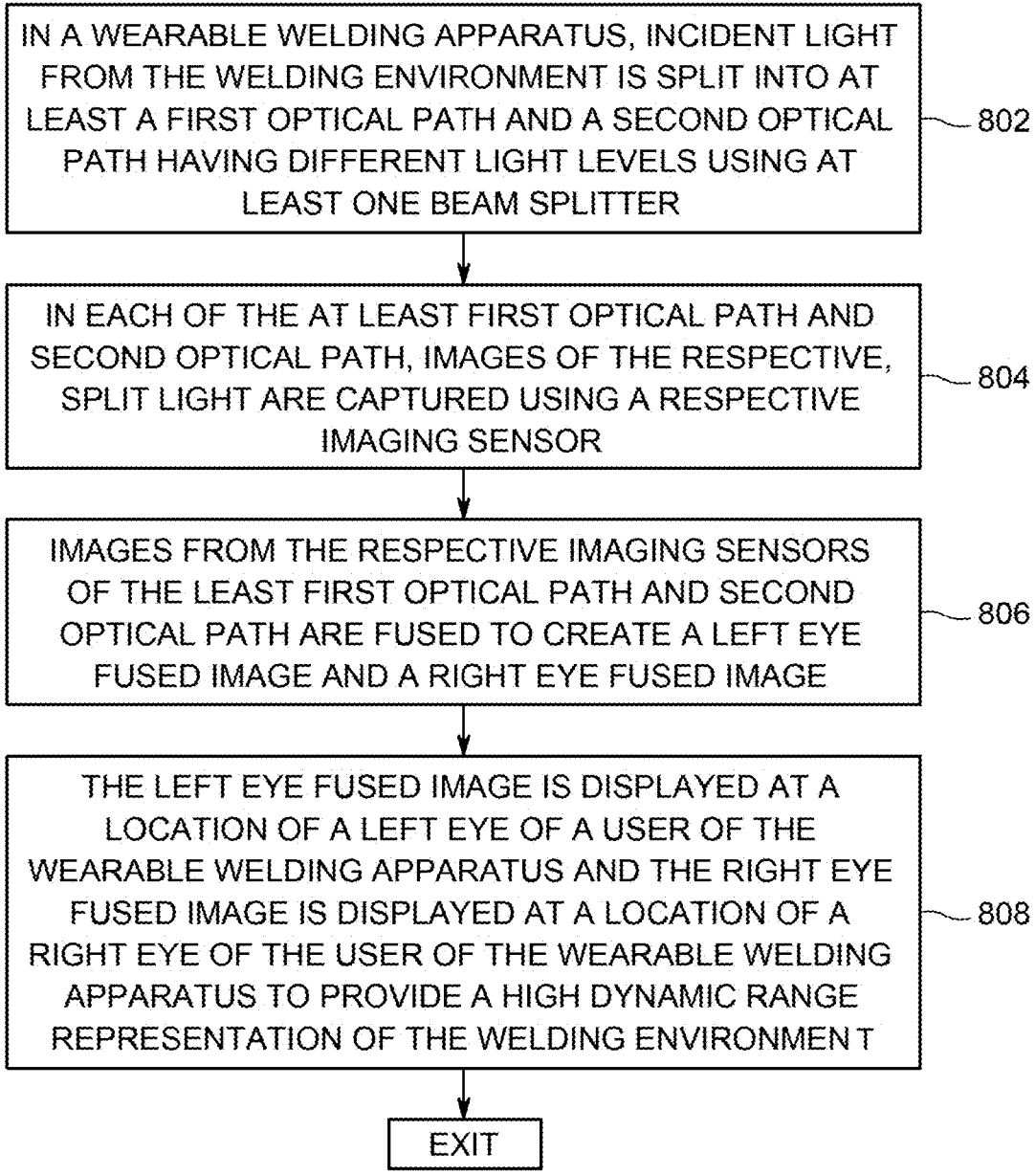
FIG. 8 depicts a flow diagram of a method for enhanced real-time welding visualization in accordance with an embodiment of the present principles.

FIG. 8 depicts a flow diagram of a method 800 for enhanced real-time welding visualization in accordance with an embodiment of the present principles. The method 800 begins at 802 during which, in a wearable welding apparatus, such as the advanced welding mask/helmet system in accordance with embodiments of the present principles, incident light in a welding environment is split using a beam splitter into at least a first optical path and a second optical path having different light levels. The method can proceed to 804.

At 804, images of the respective, split light in each of the first and second optical paths are captured using a respective imaging sensor. The method 800 can proceed to 806.

At 806, images from the respective imaging sensors of the least first optical path and second optical path are fused to create a left eye fused image and a right eye fused image. The method 800 can proceed to 808.

At 808, the left eye fused image is displayed at a location of a left eye of a user of the wearable welding apparatus and the right eye fused image is displayed at a location of a right eye of the user of the wearable welding apparatus to provide a, high dynamic range representation of the welding environment and optimize depth perception. The method 800 can be exited.

In some embodiments, the method 800 can include at 810, determining from which imaging sensor to display images in response to a signal indicative of a sensed light level in the welding environment.

In some embodiments, the method 800 can include at 812, displaying at least one of information and images to assist the user of the wearable welding apparatus in the performance of a weld in the welding environment, wherein the information comprises at least welding parameters of the welding environment including at least one of at least one temperature in the welding environment, a feed speed of a weld wire, a position of a weld wire, a position of a weld torch, a current or voltage of a power supply associated with the weld torch, and a dwell time and the images comprise augmented reality images including at least one of a thermal image overlaid on an image of the welding environment and a path overlaid on an image of the welding environment along which to perform a weld.

In some embodiments, the method 800 can include at 814 removing sparks from at least one image of the welding environment using at least the processes described above.

In some embodiments, the method 800 can include at 816 communicating with a welding station for determining at least operating parameters of the welding environment.

In some embodiments, the method 800 can include at 818 recording a welding process captured by the imaging sensors, where the recorded welding process can be used for training.

In some embodiments, the method 800 can include at 820 evaluating images of a welding process captured by the imaging sensors and providing feedback to a user regarding weld quality.

In some embodiments, the method 800 can include at 822 configuring the imaging sensors to capture images of the welding environment at different frame rates to create images of the welding environment having different exposures.

Figure 9:
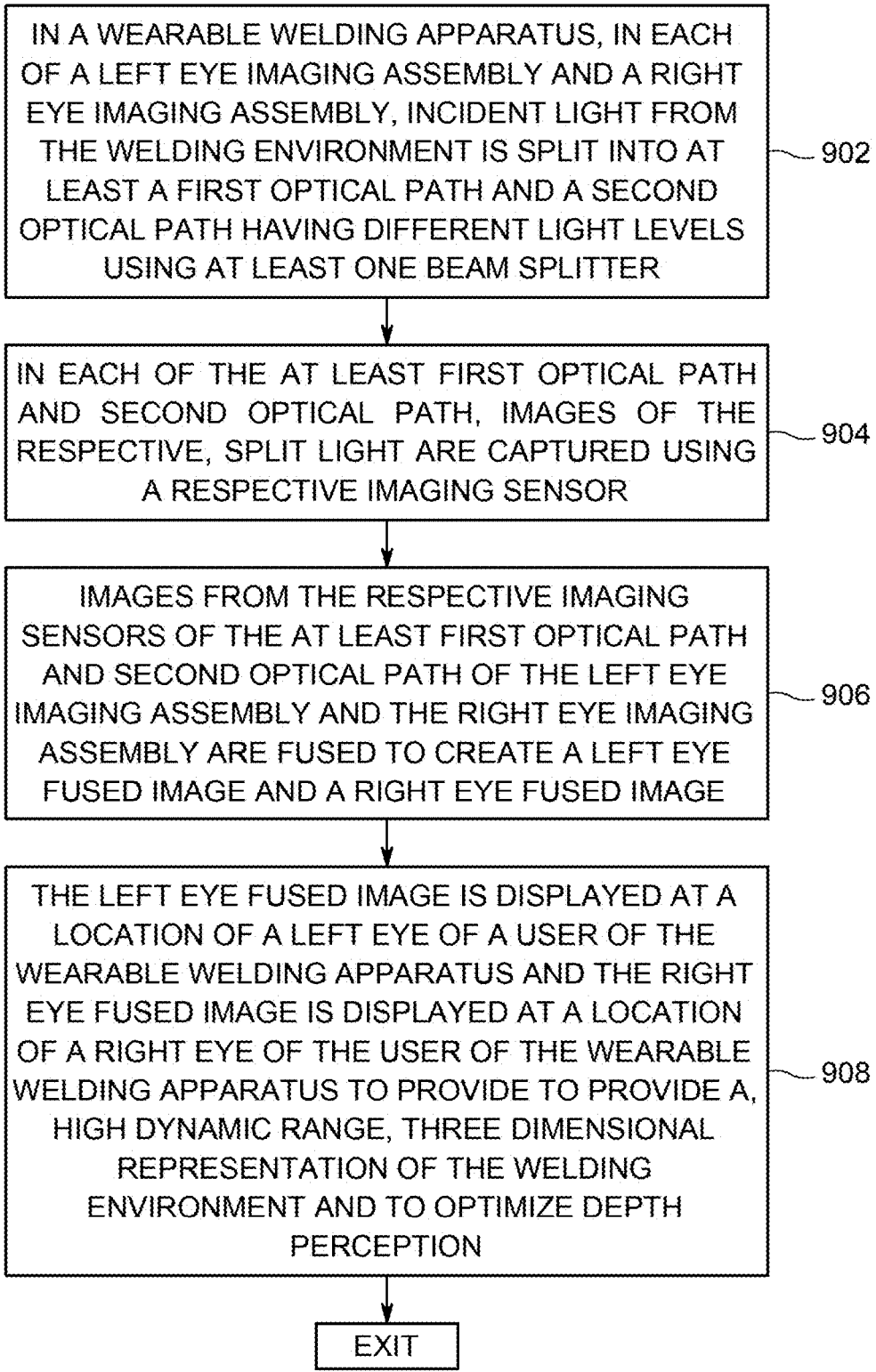
FIG. 9 depicts a flow diagram of a method 900 for enhanced real-time welding visualization in accordance with a stereo/three-dimensional embodiment of the present principles.

FIG. 9 depicts a flow diagram of a method 900 for enhanced real-time welding visualization in accordance with a stereo/three-dimensional embodiment of the present principles. The method 900 begins at 902 during which, in each of a left eye imaging assembly and a right eye imaging assembly, incident light from a welding environment is split using a beam splitter into at least a first optical path and a second optical path having different light levels. The method can proceed to 904.

At 904, in each of the at least first optical path and second optical path, images of the respective, split light are captured using a respective imaging sensor. The method 600 can proceed to 906.

At 906, images from the respective imaging sensors of the least first optical path and second optical path of the left eye imaging assembly and the right eye imaging assembly are fused to create a left eye fused image and a right eye fused image. The method 900 can proceed to 908.

At 908, the left eye fused image is displayed at a location of a left eye of a user of the wearable welding apparatus and the right eye fused image is displayed at a location of a right eye of the user of the wearable welding apparatus to provide a, high dynamic range, three dimensional representation of the welding environment and optimize depth perception. The method 900 can be exited.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from control unit 130 can be transmitted to control unit 130 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a control unit or a "virtual machine" running on one or more control units). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

Embodiments of the present principles include an apparatus for enhanced real-time welding visualization in a welding environment including a beam splitter splitting incoming light from the welding environment into at least a first optical path and a second optical path having different light levels, the at least first and second optical paths each comprising a respective imaging sensor, a control unit receiving and fusing the images from each of the respective imaging sensors in the at least first optical path and second optical path to create a left eye fused image and a right eye fused image, and a display assembly displaying the left eye fused image at a location of a left eye of a user of the apparatus and the right eye fused image at a location of a right eye of the user of the apparatus.

The apparatus can further include a left eye imaging assembly and a right eye imaging assembly, each of the left eye imaging assembly and the right eye imaging assembly including at least one beam splitter splitting incoming light from the welding environment into at least a first optical path and a second optical path having different light levels, the at least first and second optical paths each comprising a respective imaging sensor, where images captured in the left eye imaging assembly are fused and displayed at the location of the left eye of the user of the apparatus and images captured in the right eye imaging assembly are fused and displayed at the location of the right eye of the user of the apparatus to provide a three dimensional representation of the welding environment.

In some embodiments, the apparatus can include at least one photo sensor for sensing light levels in the welding environment and the control unit determines from which imaging sensor to display images based on a signal received from at least one of the at least one photo sensor and at least one of the imaging sensors, the received signal indicative of a sensed light level in the welding environment.

In addition or alternatively, in some embodiments, the apparatus can further include at least one temperature sensor for sensing temperatures in the welding environment. In such embodiments and others, the control unit causes a display, on the display assembly of a message indicative of a sensed temperature in the welding environment in response to a signal communicated from the at least one temperature sensor indicative of a sensed temperature in the welding environment.

In some embodiments, in the apparatus the display of the welding environment includes a simultaneous display of images of an arc of a weld in progress, a welding wire, a tip of a welding torch, a puddle of molten metal just welded, a glowing bead of a weld that just solidified, the bead of the weld as the bead cools down and no longer glows, a region of a sample to be welded, and a background region surrounding the weld area, wherein the simultaneous display includes all of the details of an individual display of images of the arc of a weld in progress, the welding wire, the tip of the welding torch, the puddle of molten metal just welded, the glowing bead of the weld that just solidified, the bead of the weld as the bead cools down and no longer glows, the region of the sample to be welded, and the background region surrounding the weld area.

In addition or alternatively, in some embodiments, in the apparatus the control unit causes a display, on the display assembly, of information to assist in the performance of a weld. In such embodiments and others, the information to assist in the performance of a weld includes at least one of an image generated by the control unit and welding parameters of the welding environment.

Alternatively or in addition, in the apparatus the control unit can include a memory for recording welding processes in the welding environment. Even further, in some embodiments an apparatus in accordance with the present principles can include at least one near infrared imaging sensor for enabling imaging of the welding environment in the presence of smoke.

In at least some embodiments, the imaging sensors of the at least two optical paths of the apparatus include printed circuit board cameras. Alternatively or in addition, the apparatus can include at least one of a neutral density filter and a camera lens in at least one of the at least first and second optical paths for further differentiating the light level between the at least first and second optical paths.

Embodiments of the present principles include a method for enhancing real-time welding visualization in a welding environment including, in a wearable welding apparatus, splitting incident light from the welding environment into at least a first optical path and a second optical path having different light levels using at least one beam splitter, in each of the at least first optical path and second optical path, capturing images of the respective, split light using an imaging sensor, fusing the images from the respective imaging sensors of the least first optical path and second optical path of the left eye imaging assembly and the right eye imaging assembly to create a left eye fused image and a right eye fused image, and displaying the left eye fused image on a display at a location of a left eye of a user of the wearable welding apparatus and the right eye fused image on a display at a location of a right eye of the user of the wearable welding apparatus.

Alternatively or in addition, in some embodiments, the incident light from the welding environment is split into at least a first optical path and a second optical path having different light levels using at least one beam splitter in each of a left eye imaging assembly and a right eye imaging assembly. The images captured in the left eye imaging assembly are fused and displayed at the location of the left eye of the user of the apparatus and images captured in the right eye imaging assembly are fused and displayed at the location of the right eye of the user to provide a three dimensional representation of the welding environment.

In some embodiments, the method can further include determining from which imaging sensor to display images in response to a signal indicative of a sensed light level in the welding environment.

In some embodiments, the method can further include displaying at least one of information and images to assist the user of the wearable welding apparatus in the performance of a weld in the welding environment, wherein the information comprises at least welding parameters of the welding environment including at least one of at least one temperature in the welding environment, a feed speed of a weld wire, a position of a weld wire, a position of a weld torch, a current or voltage of a power supply associated with the weld torch, and a dwell time and the images comprise augmented reality images including at least one of a thermal image overlaid on an image of the welding environment and a path overlaid on an image of the welding environment along which to perform a weld.

In accordance with some embodiments of the present principle, the method can include removing sparks from at least one image of the welding environment and alternatively or in addition, can also include communicating with a welding station for determining at least operating parameters of the welding environment.

In some embodiments, for training or other purposes, the method can include recording a welding process captured by the imaging sensors. In such and other embodiments, the method can include evaluating images of a welding process captured by the imaging sensors and providing feedback to a user regarding weld quality.

In some embodiments in accordance with the present principles, the method can include configuring the imaging sensors to capture images of the welding environment at different frame rates to create images of the welding environment having different exposures.

Embodiments in accordance with the present principles include a method for enhanced real-time welding visualization and assistance in a welding environment including splitting incoming light into a first optical path having a minority of the split light and a second optical path having a majority of the split light using a beam splitter, and in the first optical path, focusing the minority of the split light from the beam splitter using a high f-number lens, filtering the focused light from the high f-number lens using a neutral density filter, and capturing images of the filtered light from the neutral density filter using a first camera. In some embodiments the method can further include, in the second optical path, focusing the majority of the split light from the beam splitter using a low f-number lens, capturing images of the light from the low f-number lens using a second camera, fusing the images from the first camera and the second camera, and displaying at least a portion of the fused images as left eye display images and right eye display images.

Alternatively, a method for enhanced real-time welding visualization and assistance in a welding environment includes in each of a left eye imaging assembly and a right eye imaging assembly, splitting incoming light into a first optical path having a minority of the split light and a second optical path having a majority of the split light using a beam splitter, and in the first optical path, focusing the minority of the split light from the beam splitter using a high f-number lens, filtering the focused light from the high f-number lens using a neutral density filter, and capturing images of the filtered light from the neutral density filter using a first camera. In some embodiments the method can further include, in the second optical path, focusing the majority of the split light from the beam splitter using a low f-number lens, capturing images of the light from the low f-number lens using a second camera. The method can further include, fusing the images from the first camera and the second camera of the left eye imaging assembly and the right eye imaging assembly, and displaying at least a portion of the fused images as left eye display images and right eye display images.

The invention claimed is:

1. An apparatus for enhanced real-time welding visualization in a welding environment, comprising:
   a beam splitter splitting incoming light from the welding environment into at least a first optical path and a second optical path each comprising a respective imaging sensor capturing images in each of the at least first and second optical paths with at least two different exposure times at a rate at least twice as fast as a display rate of a display assembly;
   a control unit receiving and fusing the images from each of the respective imaging sensors in the at least first optical path and second optical path to create a fused image having a higher dynamic range than the individually captured images; and
   the display assembly displaying the fused images.

2. The apparatus of claim 1, wherein the beam splitter, the at least first and second optical paths, and the respective imaging sensors comprise a left eye imaging assembly and a right eye imaging assembly comprises;
   at least one respective beam splitter splitting incoming light from the welding environment into at least a third optical path and a fourth optical path each comprising a respective imaging sensor capturing images from the at least third and fourth optical paths with at least two different exposure times at a rate at least twice as fast as the display rate of the display assembly; and
   wherein images captured by the respective imaging sensors of the at least first and second optical paths in the left eye imaging assembly are fused by the control unit and displayed by the display assembly at a location of a left eye of a user of the apparatus and images captured by the respective imaging sensors of the at least third and fourth optical paths in the right eye imaging assembly are fused by the control unit and displayed by the display assembly at a location of a right eye of the user of the apparatus to provide a three dimensional representation of the welding environment.

3. The apparatus of claim 2, wherein the control unit selects for display images captured by at least one of the respective imaging sensors based on at least measured light levels in the welding environment determined from images captured by at least one of the respective imaging sensors.

4. The apparatus of claim 1, further comprising at least one temperature sensor for sensing temperatures in the welding environment.

5. The apparatus of claim 4, wherein the control unit causes a display, on the display assembly, of a message indicative of a sensed temperature in the welding environment in response to a signal communicated from the at least one temperature sensor indicative of a sensed temperature in the welding environment.

6. The apparatus of claim 1, wherein the displaying of the images of the welding environment comprises a simultaneous display of images of an arc of a weld in progress, a welding wire a welding torch, a puddle of molten metal just welded, a glowing bead of a weld that just solidified, the bead of the weld as the bead cools down and no longer glows, a region of a sample to be welded, and a background region surrounding the weld area, wherein the simultaneous display includes all of the details of an individual display of images of the arc of a weld in progress, the welding wire, the tip of the welding torch, the puddle of molten metal just welded, the glowing bead of the weld that just solidified, the bead of the weld as the bead cools down and no longer glows, the region of the sample to be welded, and the background region surrounding the weld area.

7. The apparatus of claim 1, wherein the control unit causes a display, on the display assembly, of information to assist in the performance of a weld.

8. The apparatus of claim 7, wherein the information to assist in the performance of a weld comprises at least one of an image generated by the control unit and welding parameters of the welding environment.

9. The apparatus of claim 1, wherein the control unit comprises a memory for recording welding processes in the welding environment.

10. The apparatus of claim 1, further comprising at least one near infrared imaging sensor for enabling imaging of the welding environment in the presence of smoke.

11. The apparatus of claim 1, wherein the imaging sensors comprise printed circuit board cameras.

12. The apparatus of claim 1, further comprising at least one of a neutral density filter and a camera lens in at least one of the at least first and second optical paths for differentiating a light level between the at least first and second optical paths.

13. A method for enhancing real-time welding visualization in a welding environment, the method comprising:
in a wearable welding apparatus,
splitting incident light from the welding environment into at least a first optical path and a second optical path using at least one beam splitter;
in each of the at least first optical path and second optical path, capturing images of the split light using a respective imaging sensor with at least two different exposure times at a rate at least twice as fast as a display rate;
fusing the images from the respective imaging sensors of the at least first optical path and second optical path to create a fused image having a higher dynamic range than the individually captured images; and
displaying the fused images.

14. The method of claim 13, wherein the method is repeated for each of a left eye imaging assembly and a right eye imaging assembly.

15. The method of claim 13, further comprising displaying at least one of information and images to assist a user of the wearable welding apparatus in the performance of a weld in the welding environment, wherein the information comprises at least one of welding parameters of the welding environment including at least one of at least one temperature in the welding environment, a feed speed of a weld wire, a position of a weld wire, a position of a weld torch, a current or voltage of a power supply associated with the weld torch, and a dwell time and the images comprise augmented reality images including at least one of a thermal image overlaid on an image of the welding environment and a path overlaid on an image of the welding environment along which to perform a weld.

16. The method of claim 13, further comprising removing sparks from at least one image of the welding environment.

17. The method of claim 13, further comprising communicating with a welding station for determining at least operating parameters of the welding environment.

18. The method of claim 13, further comprising evaluating images of a welding process captured by the imaging sensors and providing feedback to a user regarding weld quality.

19. The method of claim 13, further comprising configuring the imaging sensors to capture images of the welding environment at different frame rates to create images of the welding environment having different exposures.

* * * * *